(12) United States Patent
Colbeck et al.

(10) Patent No.: US 8,521,687 B2
(45) Date of Patent: Aug. 27, 2013

(54) APPARATUS, SYSTEM, AND METHOD FOR SELECTING OPTIMAL REPLICA SOURCES IN A GRID COMPUTING ENVIRONMENT

(75) Inventors: Scott Joseph Colbeck, San Jose, CA (US); Vandana Gupta, San Jose, CA (US); Jian Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1758 days.

(21) Appl. No.: 10/910,464

(22) Filed: Aug. 3, 2004

(65) Prior Publication Data

US 2006/0031266 A1    Feb. 9, 2006

(51) Int. Cl.
 *G06F 7/00* (2006.01)
 *G06F 17/00* (2006.01)

(52) U.S. Cl.
 USPC .......................................... 707/620; 707/610

(58) Field of Classification Search
 USPC .............. 709/228; 707/104.1, 202, 205, 610, 707/620
 See application file for complete search history.

(56) References Cited

U.S. PATENT DOCUMENTS

| | | | |
|---|---|---|---|
| 6,055,515 A | 4/2000 | Consestino et al. ............ 705/27 |
| 6,243,737 B1 | 6/2001 | Flanagan et al. | |
| 6,256,675 B1 * | 7/2001 | Rabinovich ................... 709/241 |
| 6,324,580 B1 * | 11/2001 | Jindal et al. .................... 709/228 |
| 6,463,454 B1 * | 10/2002 | Lumelsky et al. ............ 718/105 |
| 6,466,980 B1 | 10/2002 | Lumelsky et al. | |
| 6,516,350 B1 * | 2/2003 | Lumelsky et al. ............ 709/226 |
| 6,571,282 B1 | 5/2003 | Bowman-Amuah | |
| 6,606,643 B1 * | 8/2003 | Emens et al. .................. 709/203 |
| 6,886,035 B2 | 4/2005 | Wolff | |
| 6,910,038 B1 | 6/2005 | James | |
| 7,139,282 B1 * | 11/2006 | Dyckerhoff et al. .......... 370/428 |
| 2002/0052941 A1 | 5/2002 | Patterson ....................... 709/223 |
| 2002/0073082 A1 | 6/2002 | Duvillier et al. .................. 707/3 |
| 2002/0133491 A1 | 9/2002 | Sim et al. ........................ 707/10 |
| 2003/0074378 A1 | 4/2003 | Midgley et al. | |
| 2003/0191795 A1 | 10/2003 | Bernardin et al. ............ 709/105 |
| 2003/0226033 A1 | 12/2003 | Zinda et al. .................... 713/201 |
| 2004/0015566 A1 | 1/2004 | Anderson et al. | |
| 2004/0019624 A1 | 1/2004 | Sukegawa ...................... 709/201 |
| 2004/0034822 A1 | 2/2004 | Marchand ...................... 714/712 |
| 2004/0088451 A1 * | 5/2004 | Han ................................ 710/52 |

(Continued)

FOREIGN PATENT DOCUMENTS

KR    2002096027    12/2002

OTHER PUBLICATIONS

Iamnitchi et al., "A Peer-to-Peer Approach to Resource Location in Grid Environments", Proceedings of the 11th IEEE International Symposium on High Performance Distributed Computing HPDC-11 2002.

(Continued)

*Primary Examiner* — Apu Mofiz
*Assistant Examiner* — Jared Bibbee
(74) *Attorney, Agent, or Firm* — Kunzler Law Group (57) ABSTRACT

An apparatus, system, and method are disclosed for selecting optimal replica sources in a grid computing environment. As disclosed, the present invention overcomes shortcomings in the art involving location and selection of replica sources. In particular, the present invention selects an optimal replica source based on current and historical network statistics, as well as user-defined policies. The user-defined policies allow for customization of the replica source search, and the option of obtaining multiple ranked sources for parallel data transfer.

18 Claims, 8 Drawing Sheets

(56) References Cited

U.S. PATENT DOCUMENTS

| | | | |
|---|---|---|---|
| 2004/0103194 A1* | 5/2004 | Islam et al. | 709/225 |
| 2005/0015466 A1 | 1/2005 | Tripp | |
| 2005/0027858 A1* | 2/2005 | Sloth et al. | 709/224 |
| 2005/0076173 A1* | 4/2005 | Merril et al. | 711/100 |
| 2005/0120353 A1 | 6/2005 | Zhang et al. | |
| 2006/0029016 A1* | 2/2006 | Peles | 370/328 |

OTHER PUBLICATIONS

Sudharshan Vazhkudai et al., "Predicting the Performance of Wide Area Data Transfers", Proceedings of the 16$^{th}$ International Parallel and Distributed Processing Symposium (IPDPS 2002), 10 pages.

Heinz Stockinger et al., "File and Object Replication in Data Grids", 10$^{th}$ IEEE Symposium on High Performance and Distribution Computing (HPDC 2001), San Francisco, California, Aug. 7-9, 2001.

Sudharshan Vazhkudai et al., "Replica Selection in the Globus Data Grid", IEEE International Symposium on Cluster Computing and the Grid (CCGrid2001), May 2001, pp. 106-113.

Gregor von Laszewski et al., "A File Transfer Component for Grids", 2003 International on Parallel and Distributed Processing Techniques and Applications, Jun. 23-26, 2003, Las Vegas, Nevada, 7 pages.

Folder Clone, "Automated Folder Mirroring Software", www.folderclone.com.

Ann Chervenak et al., "Giggle: A Framework for Constructing Scalable Replica Location Services", IEEE Symposium 2002.

Salty Brine Software, "FolderClone", www.sharewareorder.com/FolderClone-download-19306.htm.

Globus Toolkit, "GT Data Management: Replica Location Service (RLS)", http://www-unix.globus.org/toolkit/data/rls/, know about as early as Feb. 1, 2004.

* cited by examiner

(Prior Art)

APPARATUS, SYSTEM, AND METHOD FOR SELECTING OPTIMAL REPLICA SOURCES IN A GRID COMPUTING ENVIRONMENT

BACKGROUND OF THE INVENTION

1. Field of the Invention

This invention relates to data management and more particularly relates to an apparatus, system and method for selecting optimal replica sources in a grid computing environment.

2. Description of the Related Art

Recent increases in networking speed, capacity, and usage have facilitated harnessing geographically disperse computing resources to solve computationally complex problems heretofore unsolvable with local computing resources. The ability to harness heterogeneous inter-networked computing resources into a single powerful tool has facilitated the development of a new computing paradigm often referred to as 'Grid Computing.' Grid computing enables the virtualization of distributed computing and data resources such as processing power, network bandwidth, and storage capacity to create a single processing image that provides users and applications seamless access to vast IT capabilities.

Figure 1:
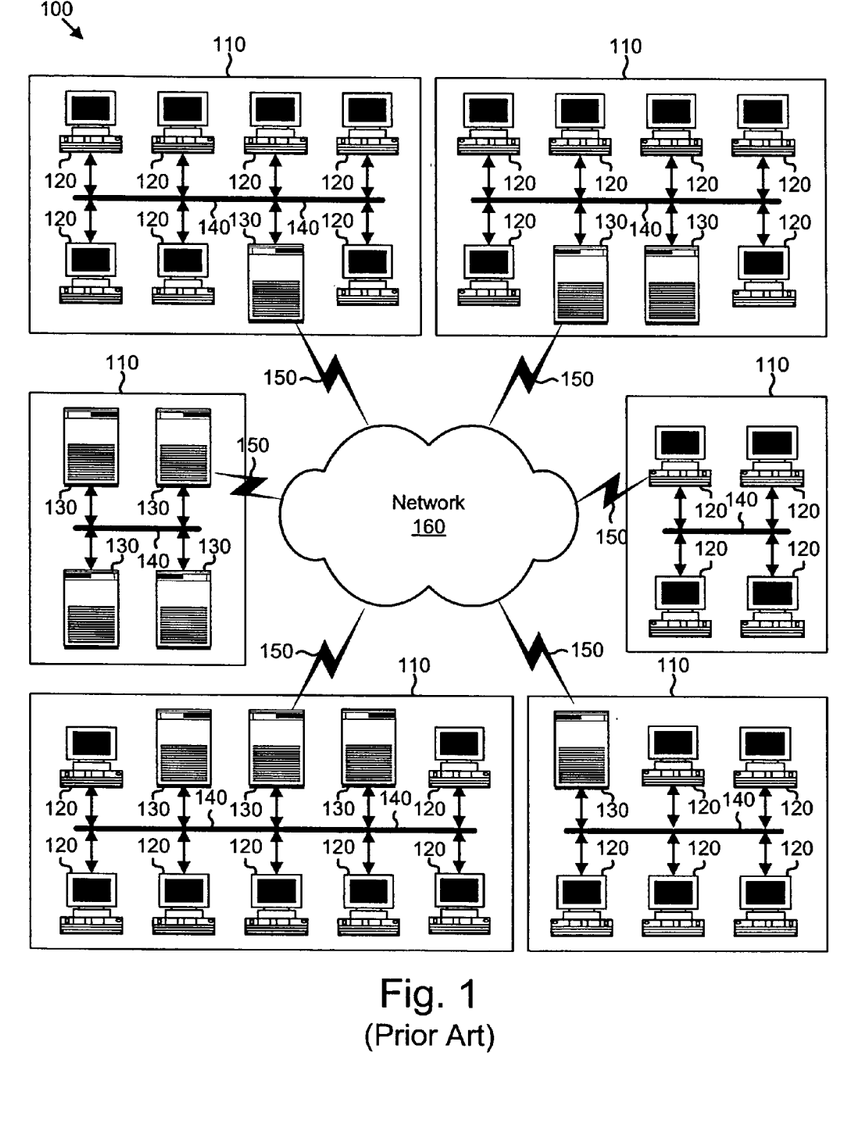
FIG. 1 is a schematic block diagram illustrating one embodiment of a typical grid computing environment.

For example, FIG. 1 is a schematic block diagram depicting one example of a typical grid computing environment 100. The depicted grid computing environment 1100 includes a number of sites 110, with computing nodes such as workstations 120 and servers 130, interconnected with a local network 140. Each computing node may comprise one or more separate file systems running on various system platforms. In the depicted arrangement, each site 110 is connected to a network 160 via one or more inter-site links 150. The network 160 may comprise a Local Area Network (LAN), Wide Area Network (WAN), the Internet, or the like.

Each computing file system 120, 130 within each site 110 may operate as a computing node within the grid. Typically, computing resources that are unused by local users and processes may be offered for use by one or more grid computing tasks. To increase the performance of data access for such tasks, it is often desirable to create local read-only copies (replicas) of data files that may be conveniently accessed during execution. Local replicas of data files may reduce network response time, improve data locality, and/or increase robustness, scalability, and performance of grid-oriented applications.

The process of creating and distributing replicas of data files to multiple distributed systems creates management issues for users and system administrators. For example, many users throughout a grid may choose to copy data files to a large number of computing nodes throughout the grid. Users may loose track of what files have been replicated and to which locations. Searching throughout the grid to update or delete such files is a very tedious, uncoordinated, and typically an error prone process.

Figure 2:
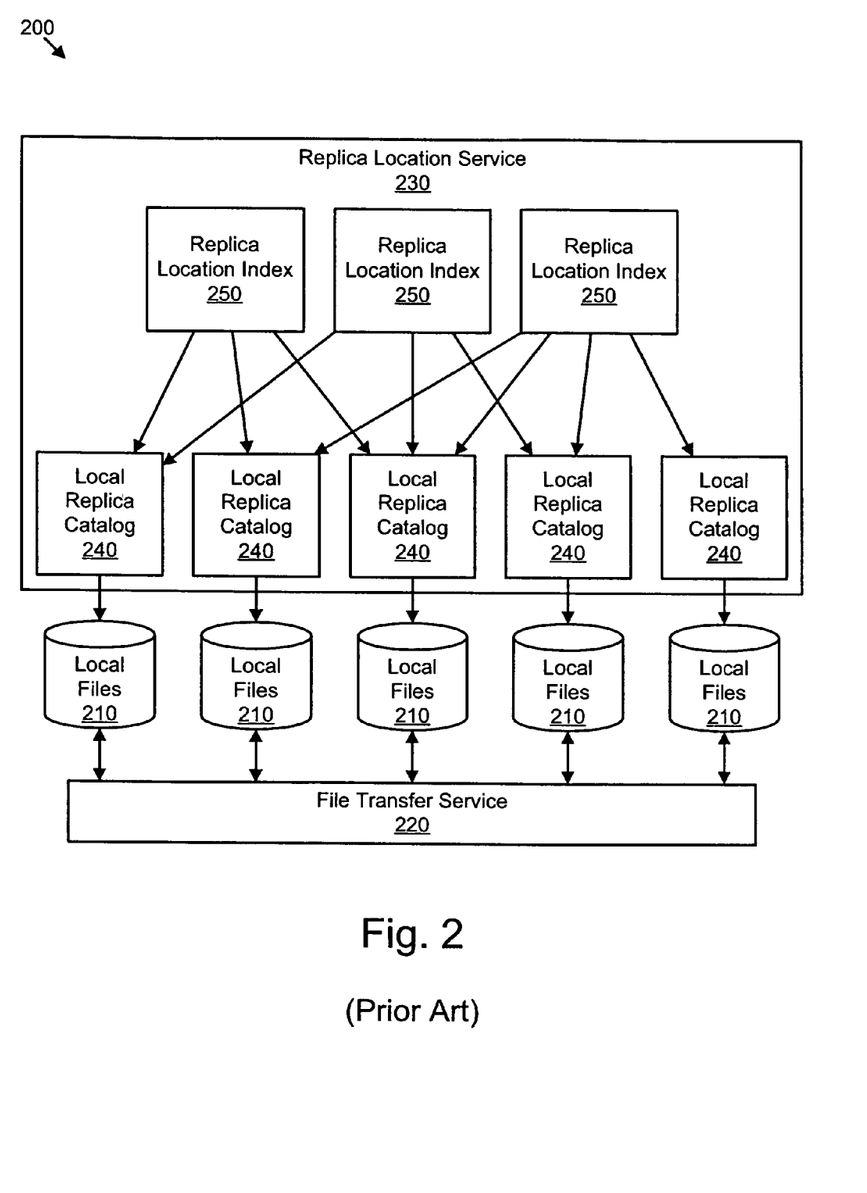
FIG. 2 is a schematic block diagram depicting one embodiment of a replication infrastructure suitable for use with the present invention.

FIG. 2 is a block diagram depicting one example of a replication infrastructure 200 that facilitates distributing and tracking replicated files throughout a grid. The depicted replication infrastructure 200 includes local files 210, a file transfer service 220, and a replica location service 230 that uses one or more local replica catalogs 240 and replica location indexes 250. The local files 210 as used herein refer to files local to the application or user, but not necessarily local to a specific file system. One well known example of the depicted replication infrastructure 200 commonly used is provided by the *Globus Toolkit*™ created in conjunction with the Open Grid Service Architecture (OGSA) and European DataGrid project.

The file transfer service 220 facilitates the transfer of data files to selected locations on the data grid. Examples of the protocols used in file transfer service 220 include a local file transfer, File Transfer Protocol (FTP), Hyper Text Transfer Protocol (HTTP), and grid FTP. Often the file transfer service 220 transfers the data files between disparate file systems. The transferred files, also referred to as replicas, are typically copied to specific data stores that contain the local files 210 in order to increase data locality and improve performance.

The local replica catalog 240 maps logical file names to physical file names. Generally, a logical file name is a unique logical identifier for desired data content and the physical file name is a unique Uniform Resource Locator (URL) that specifies the data's location on a storage system. The use of logical file names facilitates system-independent and grid-independent programming and execution.

The local replica catalog 240 typically contains mappings for data file replicas that are locally accessible on one or more data stores associated within a site 110 or similar geographical unit. The local replica catalog 240 may also store user-specified attributes associated with a file. The replica location index 250 indicates which local replica catalogs 240 contain mappings for specific logical file names.

The replica location service 230 manages the replica location indexes 250 and the local replica catalogs 240, and facilitates access to the information contained therein via an Application Programming Interface (API). Additionally, the replica location service 230 correlates one or more physical locations to a given logical file name. Multiple replica location indexes 250 can be linked via the replica location service 230 in order that logical file names that are not found within one replica location index 250 may be found in a linked replica location index 250.

The replica location service 230 facilitates managing and tracking local replicas. However, the functionality provided by the replica location service 230 is fairly primitive. For example, the replica location service 230 typically manages index and catalog entries one file at a time, and may not guarantee consistency between data replicas or the uniqueness of filenames. Additionally, the location services provided by the replica location service 230 are not integrated with file-oriented services such as the file transfer services 230 and file-oriented system calls.

One of the major drawbacks of the systems 100, 200 described above is that the replica location service 230 does not locate an optimal replica source, wherein the optimum replica source is identified by one or more preferred attribute. One example of a preferred attribute is membership of a replica source in a list of preferred replica sources. Another example is identification of a preferred replica source based upon performance of the network 160 between the replica source and a replica destination. One replica source may be preferred over another because one source may allow for more efficient and reliable copying of the replica, without undue taxation of a particular device's processing resources. The replica location service 230, does not choose any replica source preferentially over another, instead it merely provides a mapping of physical locations to the logical file name of the desired replica. An application requesting the mapping typically then chooses the first listed logical file name.

From the foregoing discussion, it should be apparent that a need exists for an apparatus, system, and method for selecting optimal replica sources in a grid computing environment. Beneficially, such an apparatus, system, and method would allow for fast, reliable, selection of the most efficient and convenient sources for replication of the data set. Selection of an optimal replica source will save time copying the replica, and reduce heavy resource taxation of overused sources within the grid.

SUMMARY OF THE INVENTION

The present invention has been developed in response to the present state of the art, and in particular, in response to the problems and needs in the art that have not yet been fully solved by currently available replica management devices. Accordingly, the present invention has been developed to provide an apparatus, system, and method for selection of optimal replica sources in a grid computing environment that overcome many or all of the above-discussed shortcomings in the art.

The apparatus to select optimal replica sources in a grid computing environment is provided with a logic unit containing a plurality of modules configured to functionally execute the necessary steps of searching existing replica source information including a mapping of logical replica source names to physical locations, collecting current network statistics for candidate replica sources, and determining an identifier for an optimal replica source in response to historical network statistics and current network statistics. These modules in the described embodiments include a search module, collection module, and determination module. In one embodiment, the apparatus may also include modules configured to receive a request for an optimal replica source location from a requesting file system, and send the identifier of the optimal replica source to the requesting file system. These modules include a receiving module and a sending module.

In one embodiment, the apparatus may include a user policy module, wherein the user policy module is configured to determine an identifier of the optimal replica source in response to one or more user-defined policies, the policies establishing rules for preferred attributes of the optimal replica source. In this embodiment, the user may be a system administrator, a grid application, or a module, device, or file system on the grid network desiring an identifier of an optimal replica source. The user-defined policies may be selected from the group consisting of file size, membership of the replica source in a preferred set of replica sources, proximity of the replica source, network response time, workload of a host for the replica source, and bandwidth of the connection to the replica source. Additionally, these user-defined policies may be weighted according to at least one preferred attributes. The user policy module may be further configured to define a desired number of replica sources to identify, the number of replica source ordered from an optimal replica source to a less optimal replica source. To create the replica, it may be desirable to determine multiple ordered replica sources to be utilized in a parallel data transfer.

In one embodiment of the apparatus, the search module is configured to communicate directly with a replica location service. In an alternative embodiment, the search module may use an internal matrix or database of replica source information. The search module may use some other external source for the replica source name and location information.

In one further embodiment, the determination module is further configured to calculate network congestion between a replica destination and candidate replica sources, the calculation including both historical network statistics and current network statistics. The network statistics may include statistics on grid traffic and statistics on other network traffic. In another embodiment, the calculation may include just current network statistics, or alternatively, just historical network statistics.

A system is also presented to select an optimal replica source in a grid computing environment. The system, in one embodiment, includes one or more replica destinations, at least one replica source, a replica source selection device comprising a search module, a collection module, and a determination module, and an interface to the replica source selection device. In one embodiment, the interface is an API for easy interaction between the replica source selection device and other devices within the system. In another embodiment, the interface is a graphical user interface.

The search module of the replica source selection device may be configured to locate existing replica source information including a mapping of logical replica source names to physical locations. The collection module may be configured to collect current network statistics for candidate replica sources. Additionally, the determination module is configured to determine an identifier for an optimal replica source in response to historical network statistics and current network statistics. In addition to these embodiments, the system performs substantially the same functionality as the apparatus described above.

A method of the present invention is also presented for selecting an optimal replica source in a grid computing environment. The method in the disclosed embodiments substantially includes the steps necessary to carry out the functions presented above with respect to the operation of the described apparatus and system.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring again to FIGS. 1 and 2, the present invention may be deployed in a networked or inter-networked environment such as the grid computing environment 100 depicted in FIG. 1, and may leverage the replication infrastructure 200 depicted in FIG. 2, to provide high-level replication and replication-related services to a user, system administrator, requesting file system, or the like.

Figure 3:
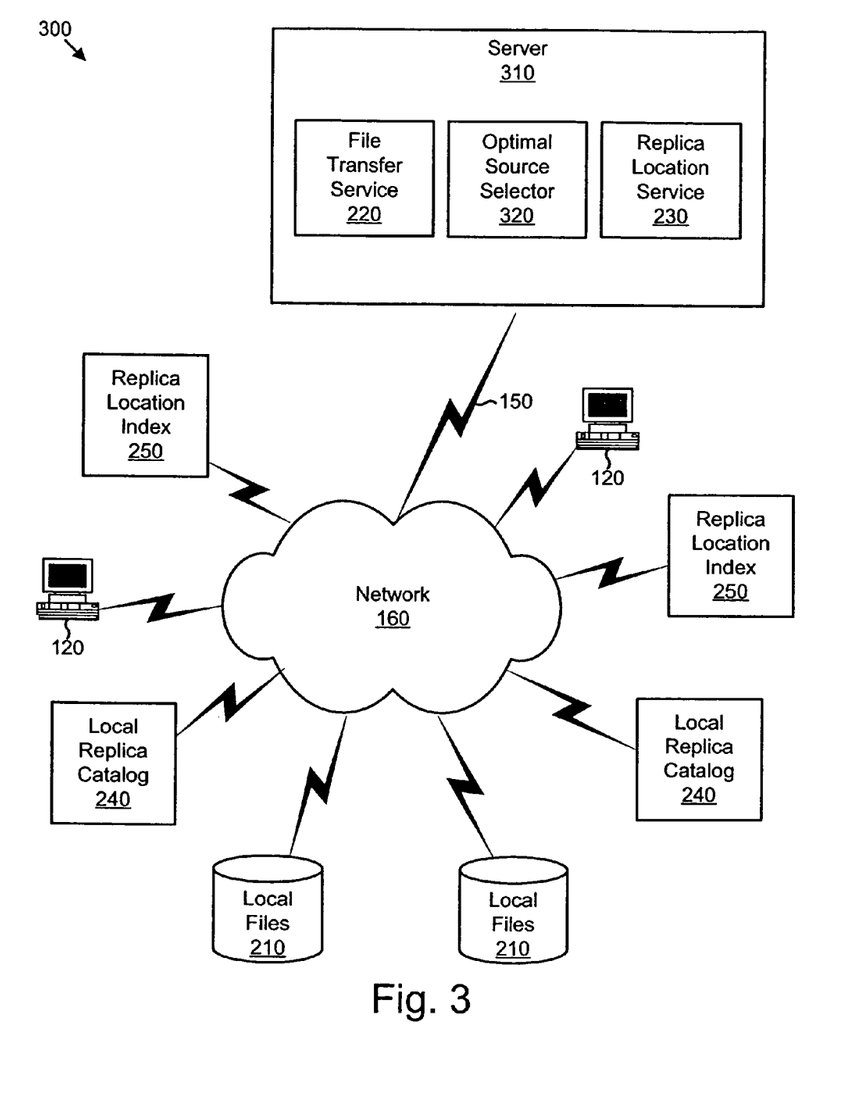
FIG. 3 is a schematic block diagram depicting one embodiment of a system for selection of an optimal replica source in a grid computing environment.

FIG. 3 is a schematic block diagram depicting one embodiment of a replica source selection system 300 of the present invention. The depicted replication system 300 includes a replication server 310 as well as components of the grid computing environment 100 (See FIG. 1) and the replication infrastructure 200 (See FIG. 2), such as one or more local replica catalogs 240 and replica location indexes 250. The replication system 300 provides high-level replication functionality to a user positioned at a workstation 120, a file system on the grid, or the like.

The workstation 120 may comprise a replica destination, and the local files 210 may comprise a replica source. In an alternative embodiment, the replica source may comprise a data server, a storage device such as a redundant disk array or a storage tape drive, an external file system (a file system other than the file system the user or user application is executed from), and the like.

Preferably, the server 310 includes an optimal source selector 320 which communicates with the replica location service 230 and the file transfer service 220. The optimal source selector 320 determines an identifier for the optimal replica source by collecting and analyzing information about candidate replica sources including physical address or physical name information from the replica location service 230, network statistics from the network 160 and a historical data set of network statistics, and user-defined policies from the replica destination, requesting file system, or other requestor.

In one embodiment, the optimal source selector 320 provides an identifier for the most optimal replica source according to at least one preferred attribute of the replica to the file transfer service 220. In this embodiment, the file transfer service 220 will copy the replica from the source with the most preferable attributes. Copying the replica from the source with the most preferable attributes, may improve network 160 performance, improve replica integrity, and reduce workload on overused replica sources.

In one embodiment, the optimal source selector 320, the replica location service 230, and the file transfer service 220 are collocated on the server 310. Alternatively, the optimal source selector 320, the replica location service 230, and the file transfer service 220 may be distributed throughout the network 160. In one embodiment, the optimal source selector 320 receives a request from the file transfer service 220 for an optimal replica source. The optimal source selector 320 then searches the information from the replica location service 230 for candidate replica sources. The optimal source selector 320 determines the optimal replica source and returns an identifier of the optimal source to the file transfer service 220. Alternatively, the workstation 120 or similar device may make the request.

Figure 4:
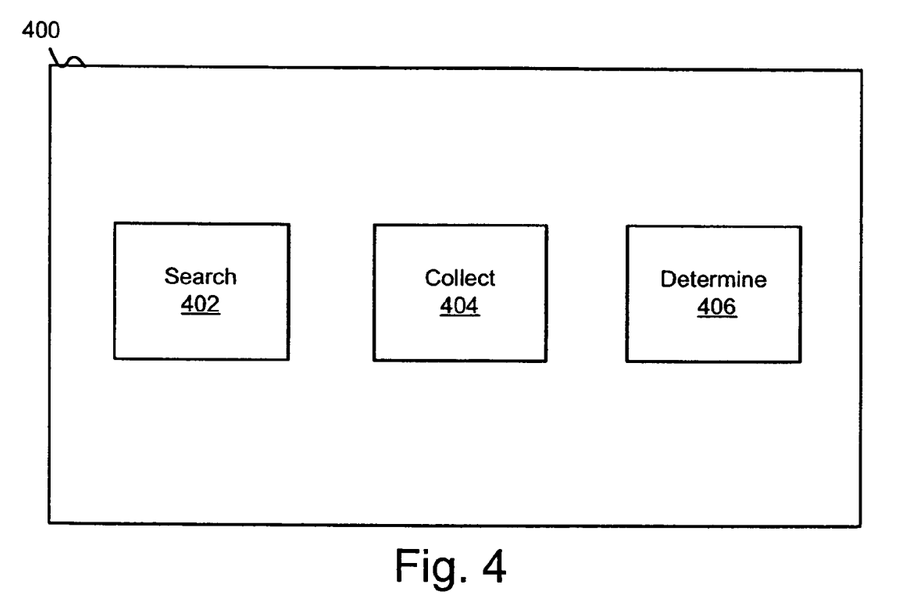
FIG. 4 is a schematic block diagram of an apparatus for selecting an optimal replica source in a grid computing environment.

FIG. 4 is a schematic block diagram of an apparatus 400 for selecting an optimal replica source in a grid computing environment. The apparatus 400 performs substantially the same functions as one embodiment of an optimal replica selector 320 described in relation to FIG. 3. The apparatus 400 includes a search module 402, a collection module 404, and a determination module 406.

In one embodiment, the search module 402 searches existing replica source information to find the physical name or address of candidate replica sources. In one embodiment, the search module 402 may also extract replica file size and historical network statistics collocated with the physical names. The search module 402 may communicate directly with the replica location service 230 and automatically search for candidate replica sources. This eliminates the need for a user or third-party user application to separately extract the candidate replica source information from the replica location service 230 and configure the apparatus 400 with the candidate replica source information.

In one embodiment, the replica location service 230 is an independent replica information management system. Alternatively, the replica location service 230 may be a matrix, array, data file, data store, or the like. The search module 402 locates source candidate information including a mapping of logical names or other identifier unique to a data set, to physical locations. The logical name may be a file name, and the physical location may be identified by a physical name such as a URL, or a replica source address, such as an Internet Protocol (IP) address or a Medium Access Control (MAC) address, with the associated replica file path name.

The collection module 404 gathers current network statistics for the candidate replica sources. The network statistics may include response times between a replica destination, or requesting file system such as the workstation 120, and the candidate replica sources, such as local files 210. Alternatively, the response time may be between the server 310 and the local files 210 or the workstation 120. Network statistics may also include the bandwidth of the connection between a requesting file system and each replica source.

Preferably, the collection module 404 gathers the network statistics in real time responsive to a request for an optimal replica source. In one embodiment, the collection module 404 may gather network response time by sending an Internet Control Message Protocol (ICMP) packet, and the bandwidth may be estimated by sending multiple packets of a predetermined size over a specific time period. Additional network statistics may include current workload for a host for the replica source, computing grid network traffic, and other network traffic measurements. Those of skill in the art may recognize other types of network statistics relevant to this application. In one embodiment, the collection module 404 may collect historical network statistics from a data set or a database located on the apparatus 400.

In some embodiments, the determination module 406 uses the current network statistics collected by the collection module 404 along with historical network statistics to determine an identifier for an optimal network source. Historical network statistics are stored statistics that are not collected in real time. This determination is preferably, made using network statistics on both grid traffic and other network traffic to calculate the optimal replica source. The calculation computationally weighs performance factors of each source and between the source and a replica destination. The factors may include the network response time, bandwidth, workload, and proximity of each source.

In one embodiment, the performance factors of each replica source are systematically compared against a predefined profile of the optimal replica source. The calculation may stop as soon as a source that meets or exceeds the optimal performance characteristics is found, and an identifier linking to the optimal replica source may be returned.

In one embodiment, the performance factors may be performance characteristics of both grid traffic, and other network traffic. Grid traffic, as used herein, is defined as traffic associated with computation, management, file transfer, and other activities performed by the components of the computing grid to accomplish tasks associated with grid control, calculations, and other grid related functions. Other network traffic may include email, file transfers, and controls not associated with the grid computing or control.

Figure 5:
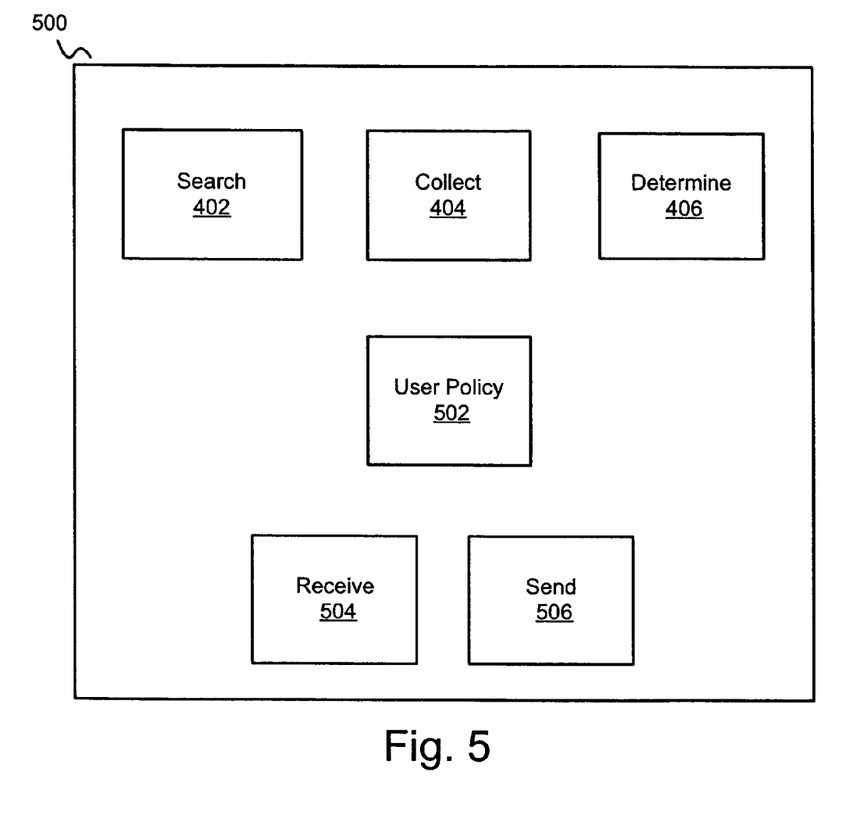
FIG. 5 is a detailed schematic block diagram of an apparatus for selecting an optimal replica source in a grid computing environment.

FIG. 5 is a detailed schematic block diagram of an apparatus 500 for selecting an optimal replica source. The apparatus 500 may include the search module 402, collection module 404, and determination module 406 described above in relation to FIG. 4. In addition, the apparatus 500 optionally includes a user policy module 502, a receive module 504, and a sending module 506.

The user policy module 502 allows a user to define certain rules that defines an optimal replica source. The rules may be used by the determination module 406 to facilitate defining a set of user-defined policies for an optimal replica source. In one embodiment, the user-defined policies relate to file size, membership of the replica source in a preferred set of replica sources, proximity of the replica source to a destination storage device, network response time, workload of a host for the replica source, and the bandwidth of the connection to the replica source.

A weight factor may be added to these user-defined policies by a user or user application. The weight factor allows certain replica source attributes to be favored over others.

In one embodiment, the number of optimal replica sources to identify and rank may be selectable to allow for parallel data transfer during creation of the replica. It may be desirable to identify multiple optimal sources for a parallel data transfer, because some data replicas may be extremely large. For example, to accomplish high speed data transfer of a file that is multiple terabytes in size, it may be advantageous to download the replica file from multiple replica sources in parallel.

In one embodiment, the user-defined policies may be persistent from one search to the next, unless actively changed by the user. Alternatively, the user-defined policies may be volatile, requiring the user to select new policies during each search. The user-defined policies may be stored in a source file. Alternatively, the user-defined policies may be entered dynamically in a graphical user interface.

The optional receive module 504 and send module 506 allow for communication between the apparatus 500 and other third-party modules or devices. In one embodiment, the receive module 504 may receive a request for an optimal replica source or ranked set of optimal replica sources from the file transfer service 220 or another replica destination.

A replica destination may comprise any module, device, or file system that desires an identifier for an optimal replica source. In this example, upon determination of the optimal replica source, the sending module 506 may send an identifier for the identified optimal replica source back to the file transfer service 220. The receive module 504 and the sending module 506 may communicate with any device, module or user requesting an identifier for an optimal replica source.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
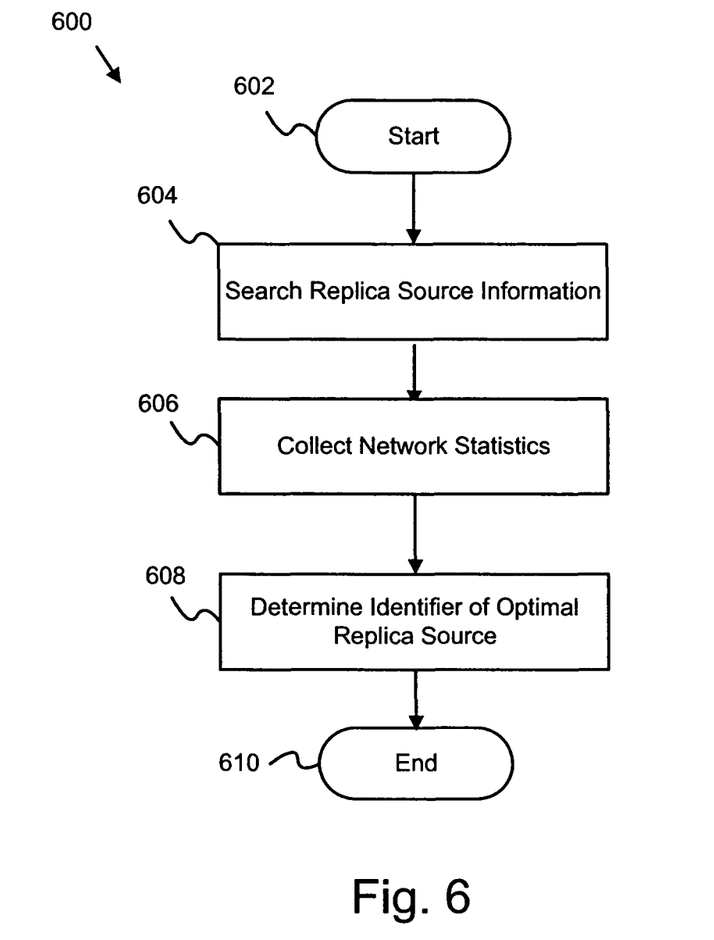
FIG. 6 is a schematic flow chart diagram illustrating one embodiment of a method for selecting an optimal replica source in a grid computing environment.

FIG. 6 is a schematic flow chart diagram of a method 600 for selecting an optimal replica in a grid computing environment. The method 600 begins 602 when an optimal replica source is requested. Preferably the method 600 identifies one or more optimal replica sources.

Initially, the search module 402 searches 604 replica source information. Typically, the search module 402 requests replica source information from a replica location service 230. In one embodiment, the replica source information is pre-existing and includes a mapping of logical replica source names to physical locations. The replica source information identifies one or more candidate replica sources in communication with a replica destination as described above. A collection module 404 collects 606 network statistics for candidate replica sources. The determination module 406 then determines 608 an identifier for the optimal replica source in response to historical network statistics and current network statistics. Upon determination 608 of the identifier, the method 600 ends 610.

Figure 7A:
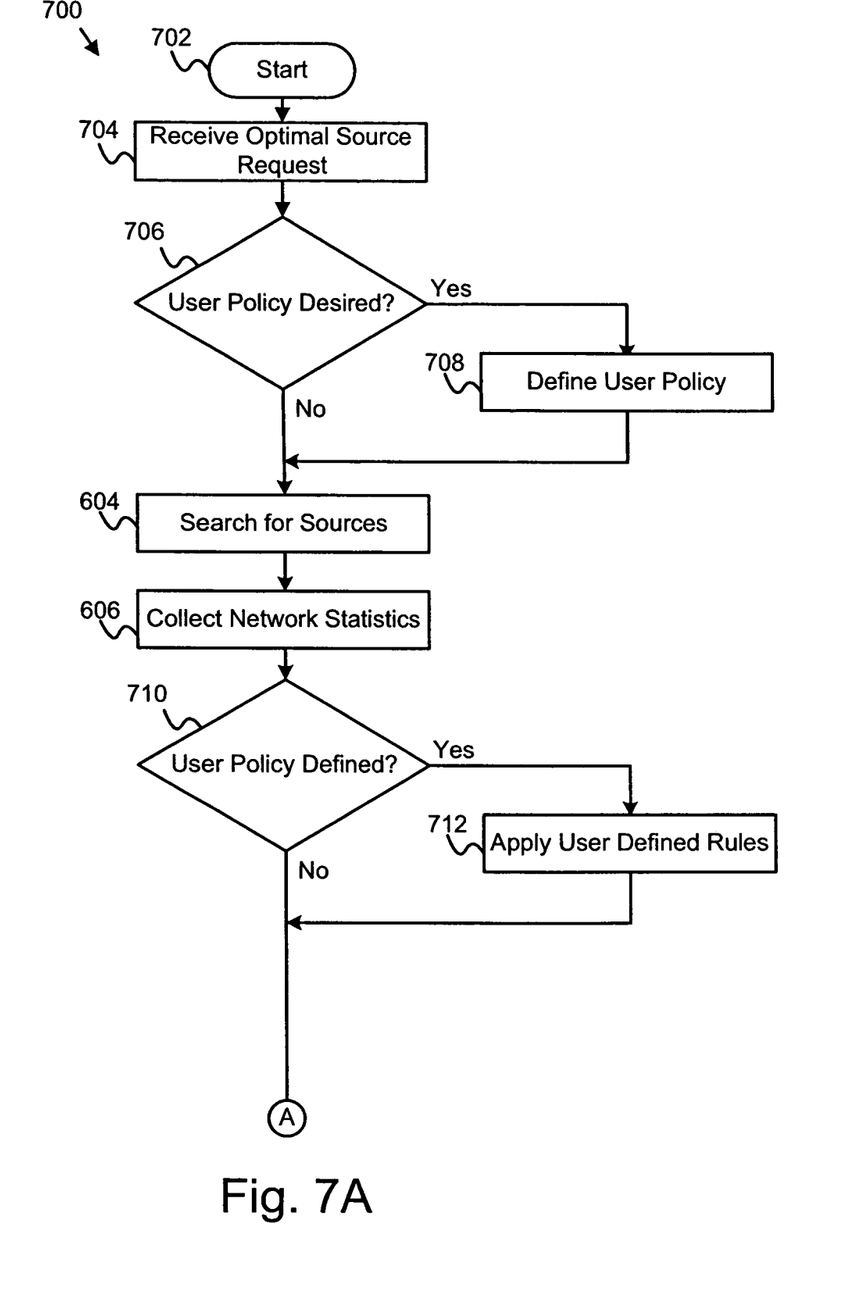
FIG. 7A is a portion of a schematic flow chart diagram illustrating one detailed embodiment of a method for selecting an optimal replica source in a grid computing environment.

FIG. 7A is a portion of a detailed schematic flow chart diagram of a method 700 for selecting optimal replica sources in a grid network environment. The method 700 begins 702, and the receiving module 504 receives 704 an optimal source request. Next, a determination 706 is made whether to apply a user-defined policy. If a user-defined policy is desired, the user-defined policy is defined 708 using the user-defined policy module 502.

Next, the searching module 402 conducts a search 604 of existing replica source information preferably provided by a replica location service 230. Then, a collection module 404 collects 606 network statistics for candidate replica sources. Next, a determination 710 is made of whether a user-defined policy has been defined 708. If so, the user-defined rules are applied 712 to the calculations in the determination module 406.

Figure 7B:
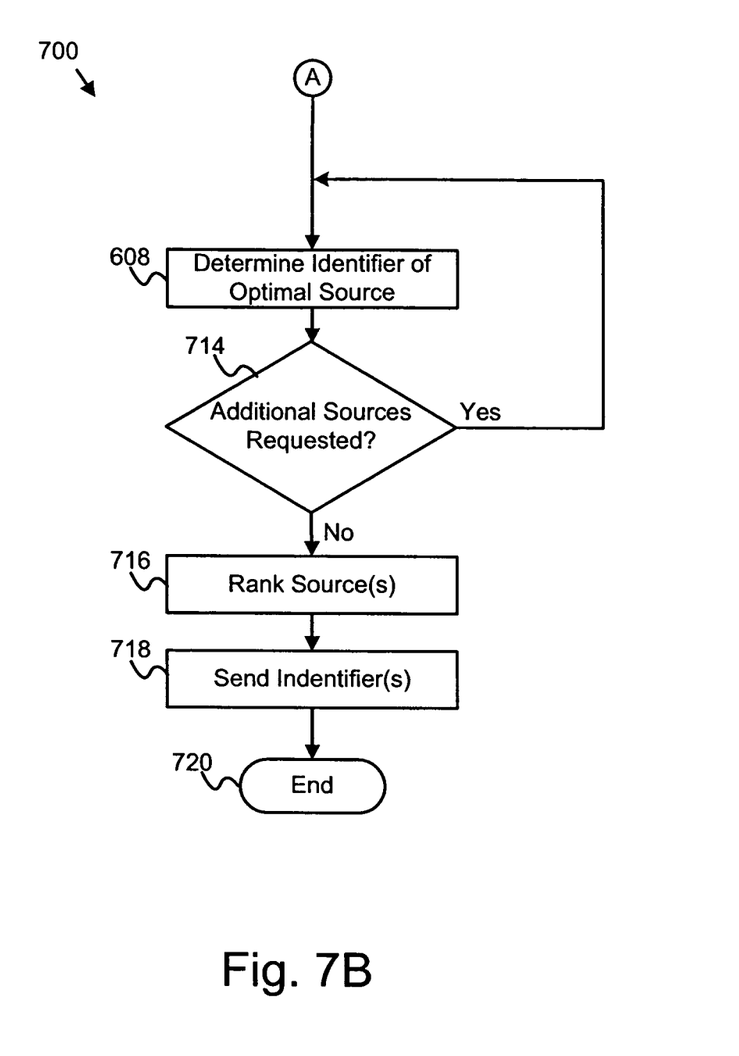
FIG. 7B is a remainder portion of a schematic flow chart diagram illustrating one detailed embodiment of a method for selecting an optimal replica source in a grid computing environment.

Next, as illustrated in FIG. 7B, the determination module 406 determines 608 an identifier of the optimal replica source. Then, the determination module 406 determines 714 if additional replica sources have been requested. If so, the method 700 returns to the determination step 608 to determine the next most optimal replica source. If no additional replica sources have been requested and a plurality of replica sources has been requested, the set of optimal replica sources may be ranked 716 from optimal to less favorable. The identifiers of the optimal replica sources are then sent 718 by the sending module 506 to the replica destination.

The apparatus, system and method for selecting an optimal replica source in a grid computing network to improve the process of locating and copying a data set replica. The present invention allows for quick, automated access to optimized and ranked information regarding the most efficient and reliable sources for the replica information. These benefits allow for improved computing reliability, reduced network resource consumption, and reduced time in copying replicas.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage device storing code executable by a processor and comprising:
a search module configured to locate existing replica source information including a mapping of logical replica source names to physical locations;
a collection module configured to collect current network statistics and maintain a history of previous network statistics for candidate replica sources, the network statistics comprising a network response time calculated by sending an Internet Control Message Protocol (ICMP) packet and a bandwidth calculated by sending multiple packets of a predetermined size over a specified time period;
a determination module configured to determine identifiers for replica sources by starting with historical data to select a first trial which acts as a predefined profile for determining optimal replica sources and then checking statistics for other more optimal options in response to historical network statistics and current network statistics and rules of a user policy module;
the user policy module comprising one or more user-defined policies, the policies establishing rules for preferred attributes of the replica sources, wherein the user-defined policies comprise a desired number of replica sources to identify, the number of replica sources ordered from a most optimal replica source to a least optimal replica source, file size, membership of the replica sources in a preferred set of replica sources, proximity of the replica sources, network response time, workload of a host for the replica sources, and bandwidth of the connection to the replica sources; and
a sending module configured to send the identifiers of the replica sources to a file transfer service that copies from the replica sources in a parallel data transfer to create a replica.

2. The apparatus of claim 1, wherein the user-defined policy rules are weighted according to at least one preferred attribute.

3. The apparatus of claim 1, wherein the determination module is further configured to calculate network congestion between a replica destination and candidate replica sources, the calculation including both historical network statistics and current network statistics, the network statistics including statistics on grid traffic and statistics on other network traffic.

4. The apparatus of claim 1, wherein the search module is configured to communicate directly with a Replica Location Service.

5. An apparatus to select an optimal replica source in a grid computing environment, the apparatus comprising:
a storage device storing code executable by a processor and comprising:
a receiving module configured to receive a request for an optimal replica source location from a requesting file system;
a search module configured to locate existing replica source information including a mapping of logical replica source names to physical locations;
a collection module configured to collect current network statistics and maintain a history of previous network statistics for candidate replica sources, the network statistics comprising a network response time calculated by sending an ICMP packet and a bandwidth calculated by sending multiple packets of a predetermined size over a specified time period;
a determination module configured to determine identifiers for replica sources by starting with historical data to select a first trial which acts as a predefined profile for determining optimal replica sources and then checking statistics for other more optimal options in response to historical network statistics and current network statistics and rules of a user policy module;

the user policy module comprising one or more user-defined policies, the policies establishing rules for preferred attributes of the replica sources, wherein the user-defined policies comprise a desired number of replica sources to identify, the number of replica sources ordered from a most optimal replica source to a least optimal replica source, file size, membership of the replica sources in a preferred set of replica sources, proximity of the replica sources, network response time, workload of a host for the replica sources, and bandwidth of the connection to the replica sources; and a sending module comprising configured to send the identifiers of the replica sources to a file transfer service of the requesting file system that copies from the replica sources in a parallel data transfer to create a replica.

6. The apparatus of claim 5, wherein the user-defined policy rules are weighted according to at least one preferred attribute.

7. The apparatus of claim 5, wherein the determination module is further configured to calculate network congestion between the requesting file system and candidate replica sources, the calculation including both historical network statistics and current network statistics, the network statistics including statistics on grid traffic and statistics on other network traffic.

8. The apparatus of claim 5, wherein the search module is configured to communicate directly with a Replica Location Service.

9. A system to select an optimal replica source in a grid computing environment, the system comprising:
- at least one replica destination;
- at least one replica source;
- an optimal source selector comprising a storage device storing code executable by a processor and comprising:
  - a search module configured to locate existing replica source information including a mapping of logical replica source names to physical locations;
  - a collection module configured to collect current network statistics and maintain a history of previous network statistics for candidate replica sources, the network statistics comprising a network response time calculated by sending an ICMP packet and a bandwidth calculated by sending multiple packets of a predetermined size over a specified time period;
  - a determination module configured to determine an identifiers for replica sources by starting with historical data to select a first trial which acts as a predefined profile for determining optimal replica sources and then checking statistics for other more optimal options in response to historical network statistics and current network statistics and rules of a user policy module;
  - the user policy module comprising one or more user-defined policies, the policies establishing rules for preferred attributes of the replica sources, wherein the user-defined policies comprise a desired number of replica sources to identify, the number of replica sources ordered from a most optimal replica source to a least optimal replica source, file size, membership of the replica sources in a preferred set of replica sources, proximity of the replica sources, network response time, workload of a host for the replica sources, and bandwidth of the connection to the replica sources;
- an interface to the replica source selection device; and
- a sending module configured to send the identifiers of the replica sources to a file transfer service that copies from the replica sources in a parallel data transfer to create a replica.

10. The system of claim 9, wherein the user-defined policy rules are weighted according to at least one preferred attribute.

11. The system of claim 10, wherein the determination module is further configured to calculate network congestion between a replica destination and candidate replica sources, the calculation including both historical network statistics and current network statistics, the network statistics including statistics on grid traffic and statistics on other network traffic.

12. The System of claim 11, wherein the search module is configured to communicate directly with a Replica Location Service.

13. A program of machine-readable instructions stored on a physical storage device and executable by a digital processing apparatus to perform operations to select an optimal replica source in a grid computing environment, the operations comprising:
- searching existing replica source information including a mapping of logical replica source names to physical locations;
- collecting current network statistics and maintaining a history of previous network statistics for candidate replica sources; and
- determining identifiers for replica sources by starting with historical data to select a first trial which acts as a predefined profile for determining optimal replica sources and then checking statistics for other more optimal options in response to historical network statistics and current network statistics, the network statistics comprising a network response time calculated by sending an ICMP packet and a bandwidth calculated by sending multiple packets of a predetermined size over a specified time period;
- determining the identifiers of the replica sources in response to one or more user-defined policies, the policies establishing rules for preferred attributes of the replica sources, wherein the user-defined policies comprise a desired number of replica sources to identify, the number of replica sources ordered from a most optimal replica source to a least optimal replica source, file size, membership of the replica sources in a preferred set of replica sources, proximity of the replica sources, network response time, workload of a host for the replica sources, and bandwidth of the connection to the replica sources; and
- sending the identifiers of the replica sources to a file transfer service that copies from the replica sources in a parallel data transfer to create a replica.

14. The program of machine-readable instructions of claim 13, wherein the user-defined policy rules are weighted according to at least one preferred attribute.

15. The program of machine-readable instructions of claim 13, wherein the instructions further comprise an operation to calculate network congestion between a replica destination and candidate replica sources, the calculation including both historical network statistics and current network statistics, the network statistics including statistics on grid traffic and statistics on other network traffic.

16. The program of machine-readable instructions of claim 13, wherein the instructions further comprise an operation to communicate directly with a Replica Location Service.

17. A method for selecting replica sources in a grid computing environment, the method comprising:

searching, by use of a processor, existing replica source information including a mapping of logical replica source names to physical locations;

collecting current network statistics and maintaining a history of previous network statistics for candidate replica sources, the network statistics comprising a network response time calculated by sending an ICMP packet and a bandwidth calculated by sending multiple packets of a predetermined size over a specified time period;

determining identifiers for replica sources by starting with historical data to select a first trial which acts as a predefined profile for determining optimal replica sources and then checking statistics for other more optimal options in response to historical network statistics and current network statistics and one or more user-defined policies, the user-defined policies establishing rules for preferred attributes of the replica sources, wherein the user-defined policies comprise a desired number of replica sources to identify, the number of replica sources ordered from a most optimal replica source to a least optimal replica source, file size, membership of the replica sources in a preferred set of replica sources, proximity of the replica sources, network response time, workload of a host for the replica sources, and bandwidth of the connection to the replica sources; and sending the identifiers of the replica sources to a file transfer service that copies from the replica sources in a parallel data transfer to create a replica.

18. An apparatus to select an optimal replica source in a grid computing environment, the apparatus comprising:

means for searching existing replica source information comprising executable code stored on a storage device, executed by a processor, and including a mapping of logical replica source names to physical locations;

means for collecting current network statistics and maintaining a history of previous network statistics for candidate replica sources comprising executable code stored on the storage device, executed by the processor, the network statistics comprising a network response time calculated by sending an ICMP packet and a bandwidth calculated by sending multiple packets of a predetermined size over a specified time period;

means for determining identifiers for replica sources by starting with historical data to select a first trial which acts as a predefined profile for determining optimal replica sources and then checking statistics for other more optimal options in response to historical network statistics, current network statistics, and one or more user-defined policies, the policies establishing rules for preferred attributes of the replica sources, wherein the user-defined policies comprise a desired number of replica sources to identify, the number of replica sources ordered from a most optimal replica source to a least optimal replica source, file size, membership of the replica sources in a preferred set of replica sources, proximity of the replica sources, network response time, workload of a host for the replica sources, and bandwidth of the connection to the replica sources; and means for sending the identifier of the replica sources to a file transfer service that copies from the replica sources in a parallel data transfer to create a replica.

* * * * *